Figure 1:
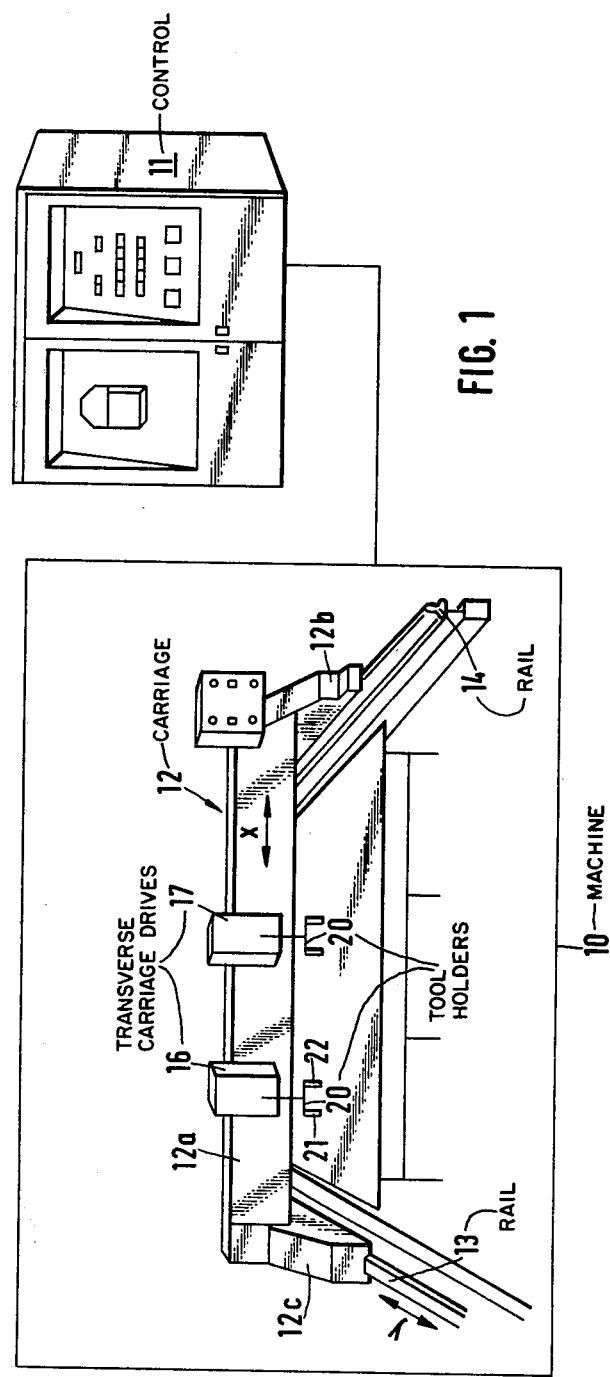

United States Patent [19]

Halbauer

[11] 4,149,236
[45] Apr. 10, 1979

[54] PROCESS FOR CONTROL OR REGULATION OF ANALOG ELECTRICAL MACHINES

[75] Inventor: Klaus Halbauer, Frankfurt, Fed. Rep. of Germany

[73] Assignee: Messer Grieshiem GmbH, Frankfurt am Main, Fed. Rep. of Germany

[21] Appl. No.: 797,439

[22] Filed: May 16, 1977

[30] Foreign Application Priority Data

May 28, 1976 [DE] Fed. Rep. of Germany ....... 2623900

[51] Int. Cl.$^2$ ...................... G05B 15/02; G06F 15/46
[52] U.S. Cl. .................................... 364/103; 318/788; 364/475
[58] Field of Search ................ 318/227, 567; 307/253, 307/252 B; 235/151.1; 266/58; 364/475, 103

[56] References Cited

U.S. PATENT DOCUMENTS

| 3,553,495 | 1/1971 | Shaugnessy | 307/252 B |
| 3,651,477 | 3/1972 | Bartlett et al. | 235/151.1 |
| 4,028,599 | 6/1977 | Zankl et al. | 318/227 |
| 4,066,916 | 1/1978 | King et al. | 307/253 |
| 4,069,446 | 1/1978 | Yonehara | 307/252 B |

OTHER PUBLICATIONS

"And now, digital flame cutting", *Metalworking Production*, Dec. 8, 1957, pp. 2177–2179.

*Primary Examiner*—David H. Malzahn
*Attorney, Agent, or Firm*—Connolly and Hutz

[57] ABSTRACT

A process for controlling or regulating analog machine elements utilizing electronic switches as the adjusting element is characterized by the on-off switching signals for the electronic switches being obtained in a digital computer in the form of digital signals which are then conducted directly to the electronic switch.

3 Claims, 2 Drawing Figures

PROCESS FOR CONTROL OR REGULATION OF ANALOG ELECTRICAL MACHINES

BACKGROUND OF THE INVENTION

The invention is concerned with a process for the control or regulation of analog electrical machines with an electronic switch as the regulating or control element. By the expression "analog electrical machines" are understood particularly electric motors and also current sources for welding and cutting. Electronic switches in the sense of the invention are preferably thyristors, transistors, and triac.

According to the previously known processes for controlling or regulating analog machines, the switches equipped with transistors are influenced and accordingly adjusted by the impulse width, while those equipped with thyristors or triac are influenced and adjusted by the phase intersection control method.

The disadvantage of these processes is that the signal for the controls and regulation of the electronic switch are obtained from analog components, whereby the aging of the analog components affects the precision adversely. Furthermore, the cost of an analog component for the impulse width modulation or for a multiple impulse thyristor phase intersection control is high.

SUMMARY OF THE INVENTION

An object of the invention is to avoid the above mentioned disadvantages and especially to achieve a process of the above type with which the on or off signals for electronic switches can be produced with great accuracy and low cost.

In accordance with the invention the on or off signals for the electronic switch are obtained in a digital computer in the form of digital signals and these digital signals are conducted directly to the electronic switch.

Thus, according to the invention, a process is accomplished according to which the necessary control signals for the electronic switches can be obtained directly in a digital computer. This way, intermediate analog elements are advantageously avoided and the cost is reduced as well as the accuracy essentially improved. Of particular advantage is that the invention is usable in connection with microprocessors as digital computers.

According to the invention, the control signals are conducted directly from a digital computer (for example: process computer, microprocessor), if necessary via amplifying or (balancing or neutralizing) intermediate elements, but without the intermediate switching of analog components and namely digital ignition impulses to the thyristors or triac and digital on and off control to the transistors.

In order to produce the digital ignition impulses for thyristors which are operated with alternating current, a message regarding the phase position of the supply voltage is preferably communicated to the digital computer.

The input of the theoretical value into the digital computer for position, speed or acceleration of the electrical machines occurs digitally or via analog-digital-transformer analog.

In order to achieve control loops, messages are preferably sent to the digital computer about the actual position, the actual speed or the actual acceleration of the electrical machines. This occurs preferably with digital message systems but can also be undertaken with analog systems after intermediate switching of one or more analog-digital transformers.

THE DRAWINGS

Figure 2:
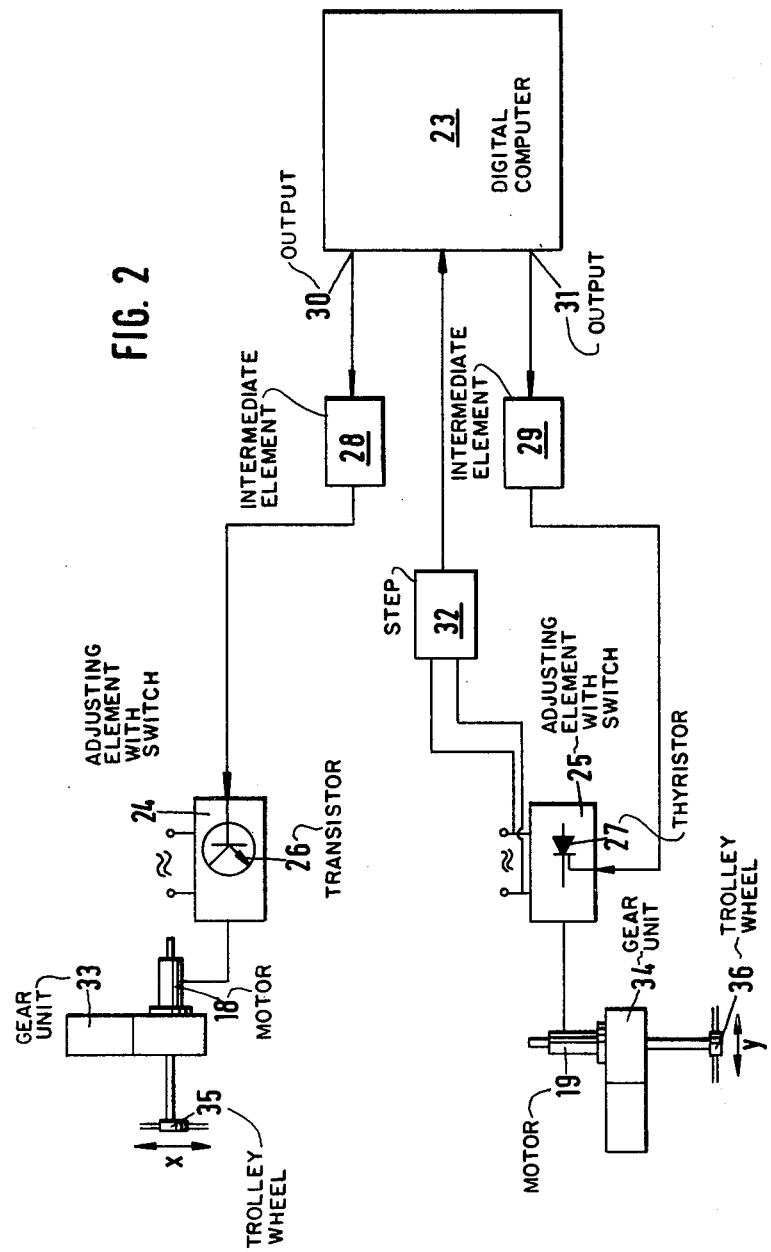

FIG. 1 diagramatically illustrates a flame cutting machine having a numerical course control; and FIG. 2 diagramatically illustrates a machine control according to the invention.

In FIG. 1, a flame cutting machine is labeled 10 and its numerical control is labeled 11.

The flame cutting machine 10 consists essentially of a carriage 12 — in especially rigidly connected, welded construction — which includes a cross beam 12a as well as a lower carriage 12b and 12c. The complete drive units for the lengthwise motion (arror Y, FIG. 1) are in lower carriage 12c. The lower carriages 12b and 12c are movable on the rails 13, 14 in the direction of the arrow Y by motor 19 (FIG. 2). Transverse drive carriages 16, 17 are provided on the cross beam 12a. These drive carriages are connected with the drive motor 18 (FIG. 2) for the purpose of moving the carriages in the direction of the double arrow X. To each of the transverse drive carriages 16 and 17 respectively, is mounted, by means of a tool holder 20, a cutting tool 21 (for example, autogenous cutting torch, plasma cutting torch, laser or the like) as well as, if necessary a gauge point or punch 22 are then attached at a constant distance in the tool holder.

The numerical control 11 illustrated in FIG. 1 is a well known numerical control with a solid state freely programmable digital computer 23 (FIG. 2) of any known suitable construction.

As shown in FIG. 2, an adjusting element 24, 25 provided with an electronic switch, is associated with each side of the motors 18, 19 which are equipped with analog components. The gear units connected to the motors 18, 19 are numbered 33 and 34 and the trolley wheels are numbered 35 and 36. The switch in each adjusting element can thereby be equipped with transistor 26 in the switch mechanism as in adjusting element 24 or also with thyristor 27 to correspond to the adjusting element 25. According to the invention the on or off control signals for the switches (transistor 26 or thyristor 27) are formed in the digital computer 23 and are then fed, if necessary by way of amplifying or decoupling intermediate elements 28, 29 but without the interposition of analog components, directly to the switch 26 or 27. The digital outputs of the computer 23, in other words, the outputs from which the computer output signals can be drawn are designated 30, 31.

Thyristors are preferably used as switches whereby in the further development of the invention, especially in regard to the control precision, the amplitude of the phase intersection of the power supply is conducted to the digital computer via a step 32.

What is claimed is:

1. In a process for controlling or regulating analog electrical machines with electronic switches as adjusting elements, the improvement being obtaining the on- or-off switching signals for the electronic switches in a digital computer in the form of digital signals, and then conducting these digital signals directly to the electronic switches with the switches being thereby controlled directly by the output signals of the digital computer without any analog intermediate elements therebetween.

2. In the process of claim 1 wherein the control of the analog electrical machines is utilized for a flame cutting machine.

3. In the process of claim 2 wherein the switches are thyristors.

* * * * *